US007582347B2

(12) United States Patent
Tuma

(10) Patent No.: US 7,582,347 B2
(45) Date of Patent: Sep. 1, 2009

(54) CLOSING MECHANISM COMPRISING A HEATING MEANS, AND METHOD FOR PRODUCING ONE SUCH CLOSING MECHANISM

(75) Inventor: Jan Tuma, Herrenberg (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 321 days.

(21) Appl. No.: 10/585,210

(22) PCT Filed: Dec. 28, 2004

(86) PCT No.: PCT/EP2004/014766

§ 371 (c)(1),
(2), (4) Date: Jul. 3, 2006

(87) PCT Pub. No.: WO2005/069691

PCT Pub. Date: Jul. 28, 2005

(65) Prior Publication Data

US 2007/0166461 A1 Jul. 19, 2007

(30) Foreign Application Priority Data

Jan. 15, 2004 (DE) ........................ 10 2004 003 127

(51) Int. Cl.
*B32B 3/10* (2006.01)

(52) U.S. Cl. ........................ 428/100; 428/209; 219/528; 219/549

(58) Field of Classification Search .................. 428/99, 428/100, 209; 219/528, 535, 549
See application file for complete search history.

(56) References Cited

U.S. PATENT DOCUMENTS

| | | | |
|---|---|---|---|
| 4,279,255 | A | 7/1981 | Hoffman |
| 4,523,594 | A | 6/1985 | Kuznetz |
| 4,696,066 | A | 9/1987 | Ball et al. |
| 5,341,927 | A | 8/1994 | Coyner |
| 5,585,026 | A | 12/1996 | Smith, Jr. et al. |
| 2003/0042249 | A1 | 3/2003 | Chen |

FOREIGN PATENT DOCUMENTS

| | | |
|---|---|---|
| DE | 196 46 318 | 5/1998 |
| DE | 199 17 726 | 1/2001 |
| DE | 101 06 705 | 4/2002 |

*Primary Examiner*—Alexander Thomas
(74) *Attorney, Agent, or Firm*—Roylance, Abrams, Berdo & Goodman, L.L.P.

(57) ABSTRACT

A closing mechanism (1; 101; 201; 301) includes a plurality of closing elements (2; 102; 202; 302; 302*a*) such as hooks, mushroom heads or loops, and a flat carrier (3; 103; 203; 303). The closing elements (2; 102; 202; 302; 302*a*) protrude from at least one surface (4) of the carrier (3; 103; 203; 303). The closing mechanism (1; 101; 201; 301) has a heater (5; 105; 205; 305), at least in certain sections, which converts supplied energy into heat. The invention also relates to an associated production method.

20 Claims, 3 Drawing Sheets

CLOSING MECHANISM COMPRISING A HEATING MEANS, AND METHOD FOR PRODUCING ONE SUCH CLOSING MECHANISM

FIELD OF THE INVENTION

The present invention relates to a closing mechanism comprising a heating means, and a method for producing one such closing mechanism.

BACKGROUND OF THE INVENTION

Generic adhesive fastener components are disclosed, for example, in DE 196 46 318 A1. An adhesive fastener generally formed from two adhesive fastener components that can be dynamically joined to each other is often used in textile or other articles of clothing, and is also known as a Velcro® fastener. Other applications are, for example, mounting technology, for example, for fastening of elements of interior trim in automotive engineering, or generally the production of a detachable fastening.

SUMMARY OF THE INVENTION

An object of the present invention is to provide improved adhesive fastener components and adhesive fasteners with increased functionality, and to provide an improved production process for such an adhesive fastener component.

This object is basically achieved by an adhesive fastener component with a plurality of adhesive fastener elements such as, for example, hooks, mushroom heads, or loops. The adhesive fastener component has a flat carrier. The adhesive fastener elements protrude from at least one surface of the carrier. The adhesive fastener component, at least in certain sections, has a printed heating means that converts supplied energy into heat.

Preferably, the heating means is applied to the carrier as flat resistance heating. In addition to the actual resistance layer, electrode layers, cover layers, reflection layers for heat radiation, protective layers, etc., can be applied. The heating layer can be applied masked or unmasked, especially masked in the form of a resistance path, preferably a meander-shaped resistance path. Several resistance and/or connection paths are electrically insulated relative to each other, and can be applied on top of each other and/or next to each other.

The adhesive fastener component can preferably be easily deformed elastically or plastically, and can be drawn into almost any shape. Preferably, the adhesive fastener component can also be deep-drawn, while retaining its adhesion capacity and heating capacity. Basically the heating means can be located on the carrier and/or in the carrier. Preferably, the heating means can be applied in thick or thin film technology to the flat carrier of the adhesive fastener component. Alternatively, the heating means is applied to another carrier connected to the flat carrier of the adhesive fastener component, especially laminated onto it.

The combination of adhesive fastener elements and heating means of the present invention is advantageous, because the thermal expansion of the resistance path and/or of the other layers of the heating means and/or of the carrier occurring in operation of the heating means can be accommodated by the adhesive fastener elements without the attachment of the adhesive fastener component being adversely affected or without, for example, flapping noise occurring due to loosening of an attachment. Moreover, it is advantageous that the adhesive fastener elements enable a flat connection of the heating means, and thus also especially good heat transfer to the heat consumer. The heating means with the carrier forms a unit so that a separate connection between the heating means and the adhesive fastener elements can be omitted.

Fundamentally all processes known from thick and thin film technology are possible for application of the heating means to the carrier of the adhesive fastener component. In one special embodiment of the present invention, the heating means is applied to the flat carrier by screen printing or offset printing. With application of the heating means, printed conductors, terminal electrodes or other electrical and/or electronic components can also be produced at the same time.

To the extent the material of the flat carrier of the adhesive fastener component enables it, for example, is formed of a polymer plastic that is semiconductive at least in certain sections, or of the corresponding textile materials, active electronic components, such as, for example, field effect transistors, can also be monolithically integrated into the adhesive fastener component. It is also possible to integrate hybrid circuit electronics, for example, to fix control circuits on especially thin and therefore flexible silicon substrates of less than 50 μm thickness, preferably less than 20 μm, on or in the carrier or to incorporate them into a textile carrier. Thus, for example, a temperature measurement element, a thermostat element and/or a switching device can also be integrated, as is often necessary for operation of a heating means.

Power can be supplied by an external energy storage device. Alternatively, the adhesive fastener component can have an energy storage device, especially an electrochemical energy storage device in thin or thick film technology.

Preferably the carrier and/or the adhesive fastener elements are made from a polymer plastic, especially from polyester or polyamide. For less stringent requirements for thermal stability polyolefins, such as, for example, polypropylene or polyethylene, or a biodegradable material or other suitable plastic can be used. For many applications, it is advantageous if the plastic is a duroplastic, for example, an acrylate plastic. Crosslinking can be controlled by some amount of energy applied, especially by irradiation and/or by supplying heat. Alternatively to a duroplastic, the plastic can also be thermoplastically moldable, and a method according to DE 196 46 318 A1 can be used to produce the adhesive fastener elements. Preferably, the adhesive fastener elements are made integral with the carrier. The adhesive fastener elements can also be produced as described in DE 101 06 705 C1, especially with an application device by which the adhesive fastener elements are built up in successively delivered droplets.

In one embodiment of the present invention, heating systems in almost any geometry can be easily mounted at poorly accessible locations, with a high level of freedom of shapes, but in a space-saving manner and, if necessary, detachably. For example, seat, mirror, interior or defrosting heating systems or the like that are simple to install can be implemented in motor vehicles, living spaces, or facilities in the open.

Moreover, according to the present invention, heating systems can be implemented for mechanical, pneumatic, hydraulic, electrical and electronic assemblies. The heat energy can be supplied exactly to the required locations in a pin-point manner and with almost any freedom of shape. For this purpose, the heating means adapted to the application can also produce heat superficially in a non-uniform manner, for example, by local variation of the resistance as a result of changes in the composition, thickness, or lateral geometry of the resistance layer.

The devices of the present invention are thin, have a low weight, can be controlled in their heat output and/or heat distribution, and offer explosion-proof heating. Based on a combination with an adhesive fastener component, complex two- and three-dimensional geometries can be permanently and reliably supplied uniformly or with a definable heat distribution. The service life potential is long compared to known heating means, especially compared to heating means having a heating wire. Terminal and connection contacts, like trigger electronics, can be integrated into the adhesive fastener component. For example, a receiver can be integrated into the adhesive fastener component, by which a control signal can be received and thereupon the heating means is turned on and off.

Preferably, the heating means is located on the surface of the adhesive fastener component opposite the adhesive fastener elements. As an alternative, adhesive fastener elements can also protrude from the two surfaces of the carrier. A partial surface can be free of adhesive fastener elements on the surface, otherwise having adhesive fastener elements, for application of the heating means. In this way, the heating means and/or its electrical contact is protected by the carrier after attachment of the adhesive fastener component.

The carrier of the adhesive fastener component can also be a textile product, especially a product produced by weaving, knitting, braiding, or embroidery. In this case, for example, individual threads or thread groups, especially warp and/or weft threads, of different plies of the textile product can be made as connecting leads. Such connecting leads can be formed by conductive filaments or having a conductive coating. Preferably, the heating means is located between two plies of the textile carrier.

The present invention also relates to a method for producing an adhesive fastener component with a heating means, as described above. The heating means is applied to the carrier already having adhesive fastener elements. In one special embodiment of the present invention, the heating means is applied, especially printed, in thick or thin film technology, onto the flat carrier. This method is especially advantageous when the adhesive fastener elements and the flat carrier are made in one piece by thermoplastic shaping.

An electrical contact geometry of the heating means is also possible by specifically influencing the electrical conductivity of individual or groups of adhesive fastener elements configured in a grid in regular structures. The adhesion of the heating means to be applied, that is, the adhesion of the heating means to the carrier of the adhesive fastener component, can be improved by surface treatment, especially by a gas atmosphere that increases the polarity of the carrier molecules near the surface. As an alternative or in addition, a adhesion-imparting coating, for example, a polymer differing from the carrier, can be applied to the carrier, especially when formed of polyamide.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
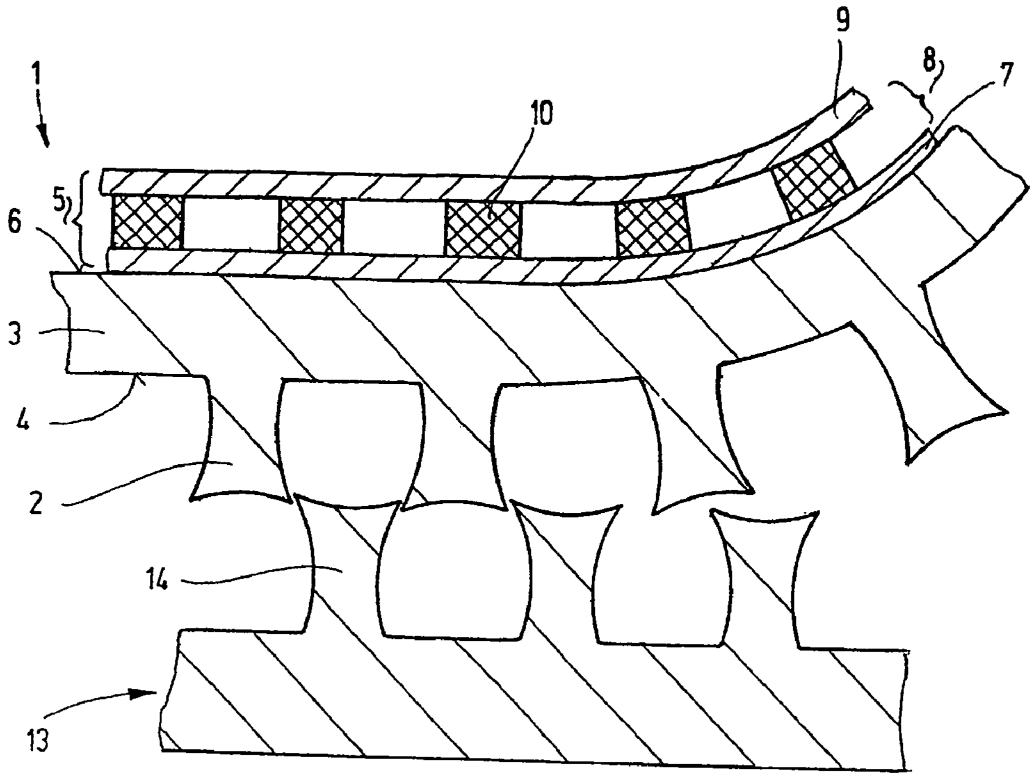
FIG. 1 is a partial side elevational view in section of an adhesive fastener with an adhesive fastener component according to a first exemplary embodiment of the present invention.

FIG. 1 shows a cross section through an adhesive fastener with an adhesive fastener component 1 according to a first exemplary embodiment of the present invention. It has a plurality of adhesive fastener elements 2 configured regularly in rows and columns and formed integrally with a flat carrier 3 of thermoplastically moldable plastic. The fastener elements protrude angularly, preferably at a right angle, from a first surface 4 of the carrier 3.

On the second surface 6, opposite the first surface 4, a heating means or heater 5 is provided on the carrier 3. The heating means 5 is applied in thick film technology, especially by screen printing, to the carrier already having the adhesive fastener elements 2 completed thereon. The heating means includes an insulation layer 7, a cover layer 9, and a structured heating layer 8 located between layers 7 and 8 and formed essentially by elongated resistance paths 10.

A material for the resistance path 10 can be, for example, resistance materials known from thick film technology. Sheet resistances can be implemented in a wide range, for example, between 2 and 1000 ohms per square. Resistance materials can also be used having an electrical resistance largely independent of temperature. Alternatively, resistance materials with a definably positive or negative temperature coefficient of the resistivity can be used to implement a thermostat function during operation with a constant voltage or with a constant current.

Typical layer thicknesses are between 10 and 100 μm, especially between 20 and 50 μm. The heat outputs per unit of area depending on the application can be, for example, between 1 and 2000 watts per $m^2$, for individual or interior heating systems in motor vehicles especially between 100 and 300 watts per $m^2$. Heating optimized for the application can be implemented by the configuration and design of the resistance path 10 with respect to layer thickness, path width and resistance material. Connecting leads that may be necessary can be produced with sheet resistances below 1 ohm per square, especially less than 0.25 ohm per square, for example, also by silver enamels, copper enamels, carbon enamels and the like.

The layer thickness ratios of the carrier 3 including the adhesive fastener elements 2 and also of the heating means 5 are not shown to scale in the figures. Especially for purposes of depiction, individual layers are shown enlarged. Moreover the heating means 5 can also have more than three layers, especially other layers for protection, for blocking moisture or for electrical insulation. The adhesive fastener component 1 of the present invention can be joined, as shown in FIG. 1, to another adhesive fastener component 13 set up almost identically with respect to the carrier 3. In particular, the adhesive fastener elements 2, 14 can be detachably engaged to one another, or can also be joined to a textile adhesive fastener element or an article of textile clothing.

Figure 2:
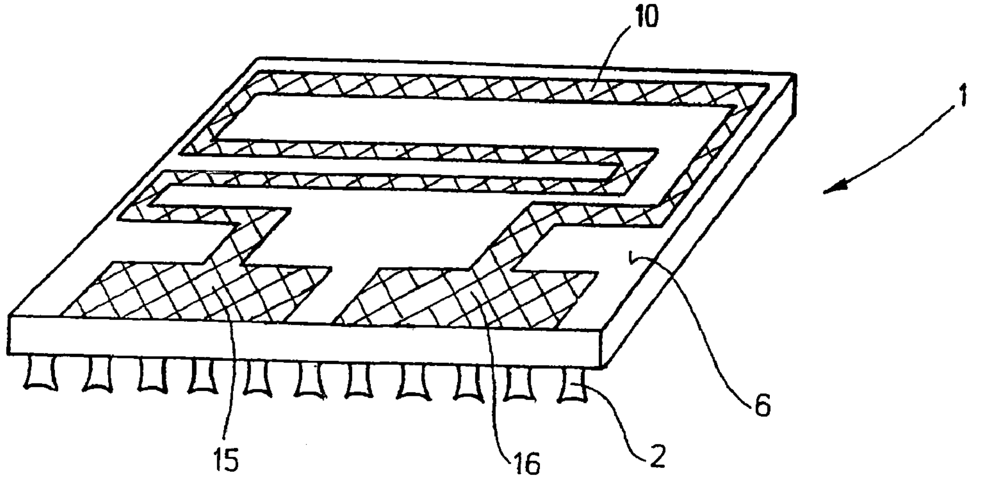
FIG. 2 is a perspective view in section of the adhesive fastener component similar to the one in FIG. 1 with the resistance path printed on the adhesive fastener component.

FIG. 2 shows a perspective view of the adhesive fastener component 1 similarly to FIG. 1, but with the resistance path 10 printed directly on the second surface 6 of the carrier 3. The resistance path 10 runs in a meander with variation both of the path width and also of the distance of adjacent path sections. Contact with the resistance path 10 can be made by terminal electrodes 15, 16, which are located next to each other on one common side of the adhesive fastener component 1.

Figure 3:
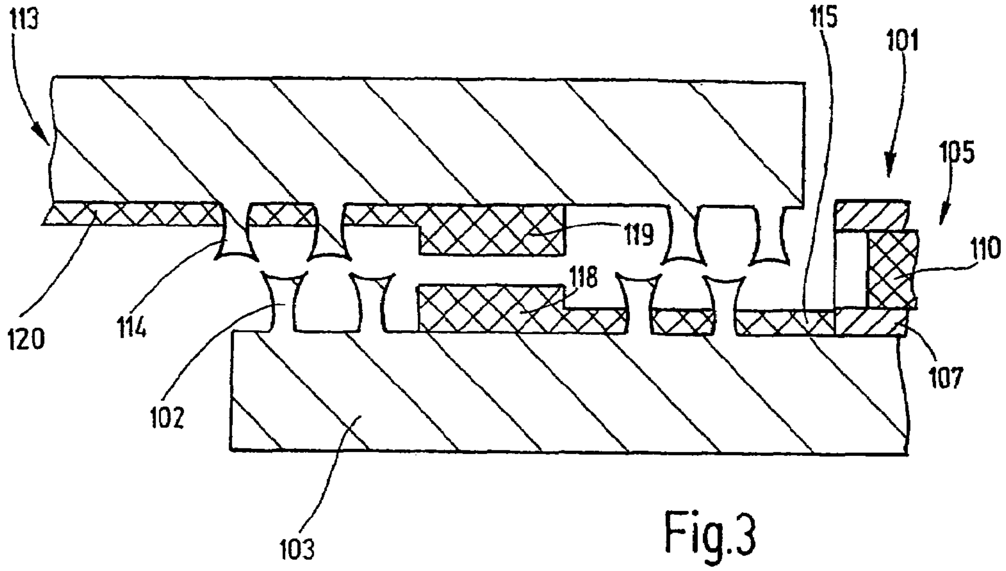
FIG. 3 is a partial side elevational view in section of an adhesive fastener according to a second exemplary embodiment of the present invention.

FIG. 3 shows a second exemplary embodiment of the adhesive fastener component 101 of the present invention. In this exemplary embodiment, the adhesive fastener elements 102 are located on the same surface as the heating means 105. The area of the carrier 103 in which the heating means 105 is located is free of adhesive fastener elements 102. On the same surface, the connecting lead 115 for the resistance path 110 printed in the insulation layer 107 is routed to the terminal protrusion 118.

Another or a second adhesive fastener component 113 on its surface facing the adhesive fastener component 101 of the present invention likewise has adhesive fastener elements 114 and a terminal protrusion 119 connected to the connecting lead 120. The adhesive fastener elements 102, 114 of the two adhesive fastener components 101, 113 are engaged to one another by pressing on them. At the same time, the two terminal protrusions 118, 119 come into electrical contact. In this way, reliable contact with the resistance path 110 can be made by the connecting lead 120.

Figure 4:
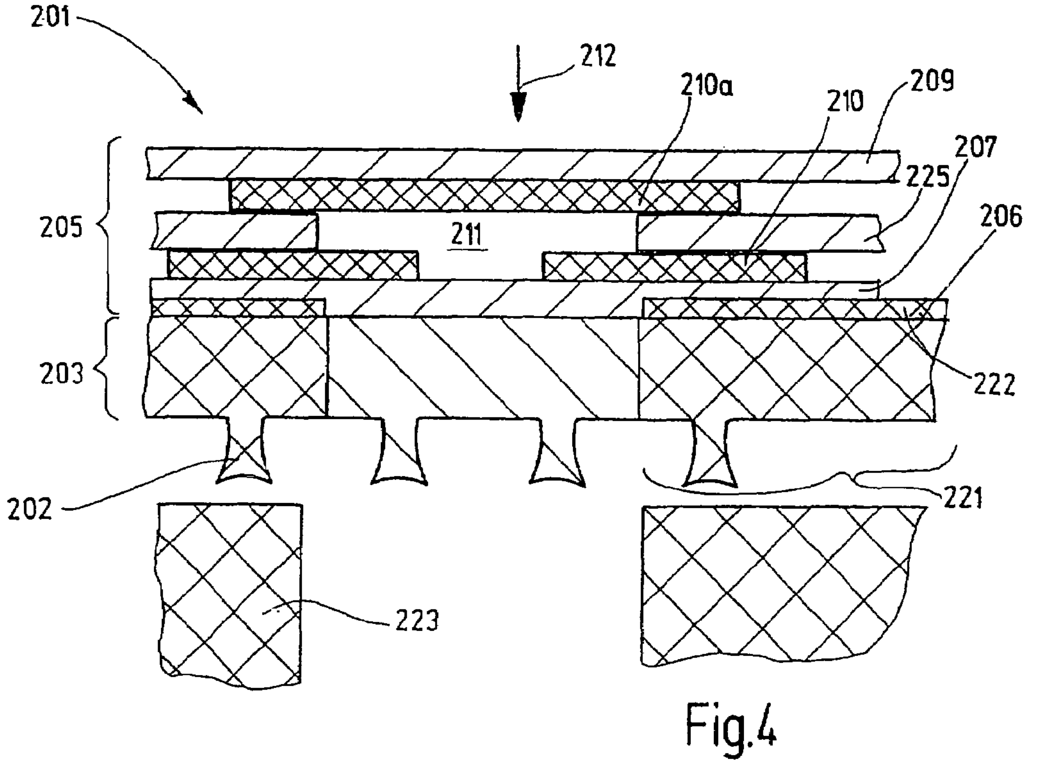
FIG. 4 is a partial side elevational view in section of an adhesive fastener according to a third exemplary embodiment of the present invention.

FIG. 4 shows a third exemplary embodiment of an adhesive fastener component 201, according to the present invention. The carrier 203 preferably of a thermoplastic, like the adhesive fastener elements 202 located in this area 221, is made electrically conductive by the corresponding modification of the plastic, as is indicated by the criss-crosshatching, for example, by intercalation of conductive particles. In these areas 221, the carrier 203 makes contact with the heating means 205 located on the second surface 206 and having an insulation layer 207 which in the corresponding areas likewise has electrically conductive terminal electrodes 222. Electrodes 222 are electrically connected to the electrically conductive adhesive fastener elements 202. In this way, the adhesive fastener component 201 and especially the heating means 205 can make electrical contact with the back of the carrier 203 opposite the heating means 205, for example, by external contact pieces 223.

Executing the heating means as a resistance layer also makes it possible to implement a pushbutton element 211 by structuring the resistance path 210. For this purpose, for example, an interruption of the resistance path 210 can be provided. With the interposition of an electrically insulating intermediate layer 225, a conductive contact bridge 210*a* is located over it. Under the action of a force according to the arrow 212 contact bridge 210*a* electrically closes the interruption as the cover layer 209 is deformed. The elasticity of the heating means 205 and/or of the carrier 203 ensures resetting of the pushbutton element 211 executed as a "make contact" in the exemplary embodiment.

Figure 5:
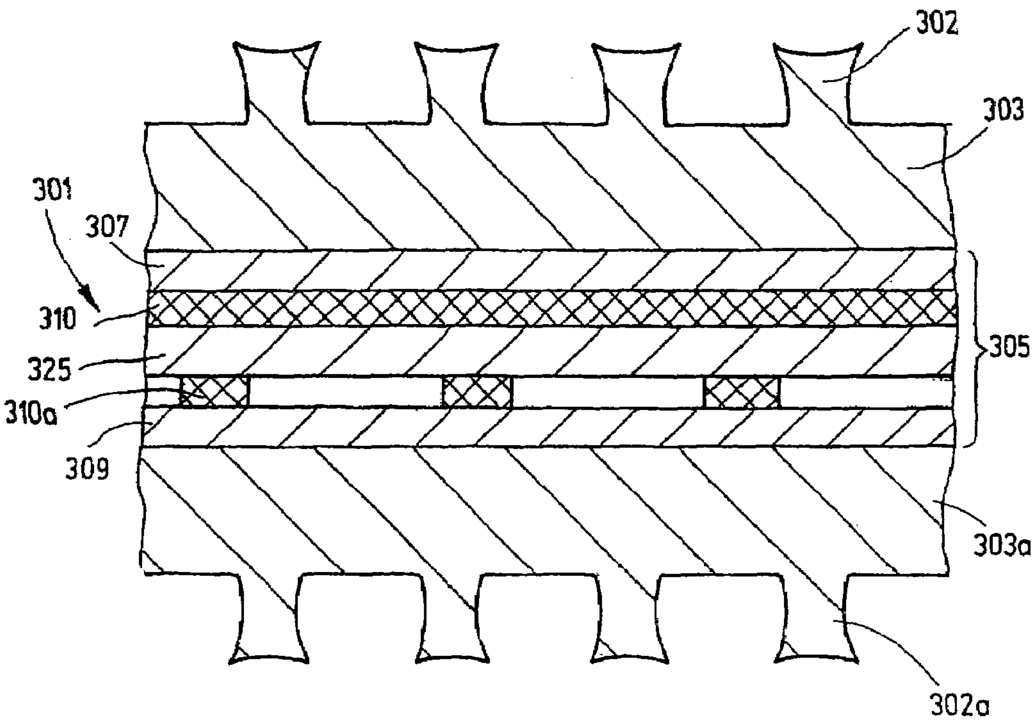
FIG. 5 is a partial side elevational view in section of an adhesive fastener according to a fourth exemplary embodiment of the present invention.

FIG. 5 shows a fourth exemplary embodiment of an adhesive fastener component 301 of the present invention. On both sides of the heating means 305, one respective carrier 303, 303*a* with adhesive fastener elements 302, 302*a* on the surface facing away from the heating means 305 is provided. Between the insulation layer 307 and the cover layer 309, two resistance paths 310, 310*a* are electrically insulated from each other by an intermediate layer 325. The lengthwise extension of the two resistance paths 310, 310*a* extends angularly to each other, especially at a right angle. The two resistance paths 310, 310*a* can be connected to each other by through-plating or externally to be electrically connected in series or parallel.

Figure 6:
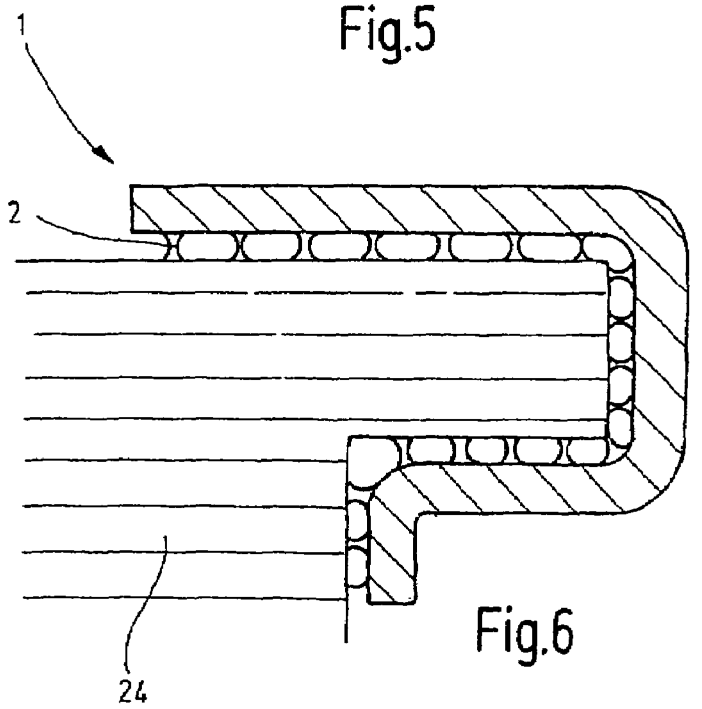
FIG. 6 is a partial side elevational view in section illustrating one application of an adhesive fastener component according to the present invention.

FIG. 6 shows one application of an adhesive fastener component 1 of the present invention. For reasons of greater clarity, the separating line between the carrier 3 and the heating means 5 (see FIG. 1) is not shown. The adhesive fastener component 1 is fixed by the adhesive fastener elements 2 on a support body 24, with a surface formed, for example, by a textile fleece material. Alternatively, on its surface, another adhesive fastener component 13 is fixed over the entire surface or in certain sections, for example, as a deep-drawn part. The adhesive fastener component 1, in spite of the projecting structure of the support body 24, ensures uniform heating on all sides. The adhesive fastener component 1 of the present invention can be formed as a deep-drawn part, while maintaining the adhesion fastening capacity, and the heating capacity, so that in each instance even complexly shaped support bodies 24 fit precisely.

While various embodiments have been chosen to illustrate the invention, it will be understood by those skilled in the art that various changes and modifications can be made therein without departing from the scope of the invention as defined in the appended claims.

What is claimed is:

1. An adhesive fastener component, comprising:

a flat carrier having opposite first and second surfaces;

a plurality of fastener elements protruding from at least said first surface of said flat carrier and being one of hooks, mushroom heads and loops; and a printed heater on at least certain sections of said flat carrier, said heater printed directly on one of said flat carrier and another carrier laminated to said flat carrier by one of thick and thin film technology, and said heater capable of converting supplied energy into heat.

2. An adhesive fastener component according to claim 1 wherein said heater converts electrical energy into heat.

3. An adhesive fastener component according to claim 2 wherein said heater comprises a resistance heater.

4. An adhesive fastener component according to claim 1 wherein said heater is one of a screen printing application and an offset printing application on said flat carrier.

5. An adhesive fastener component according to claim 1 wherein said flat carrier comprises printed conductors and terminal electrodes electrically coupled to said heater.

6. An adhesive fastener component according to claim 1 wherein said heater is applied to said other carrier laminated to said flat carrier.

7. An adhesive fastener component according to claim 1 wherein said fastener elements and said flat carrier are integral.

8. An adhesive fastener component according to claim 1 wherein said fastener elements and said flat carrier are jointly thermoplastically shaped.

9. An adhesive fastener component according to claim 1 wherein said flat carrier and said fastener elements are formed of the group consisting of polymer plastic, duroplastic, acrylate plastic, thermoplastic, polyester and polyamide.

10. An adhesive fastener component according to claim 1 wherein said flat carrier comprises a textile formed by one of weaving, knitting, braiding and embroidery.

11. An adhesive fastener component according to claim 10 wherein said flat carrier comprises two textile plies; and said heater is located between said plies.

12. An adhesive fastener component according to claim 1 wherein an energy storage device is provided on said flat carrier.

13. An adhesive fastener component according to claim 12 wherein said energy storage device comprises an electrochemical energy storage device, said electrochemical energy storage device printed on said flat carrier by one of a thick and thin film technology application.

14. An adhesive fastener component according to claim 1 wherein said flat carrier comprises an insulating layer bearing said heater.

15. An adhesive fastener component according to claim 1 wherein said heater is on said first surface between said fastener elements.

16. An adhesive fastener component according to claim 1 wherein portions of said flat carrier and said fastener elements are electrically conductive.

17. An adhesive fastener component according to claim 1 wherein said heater comprises a conductive resistance path with an interruption;

an insulating layer cover with a gap corresponding to said interruption extends over said resistance path; and a cover layer with a bridge contact bridges said interruption when deformed.

18. An adhesive fastener component according to claim 1 wherein said heater is applied directly to said flat carrier from which said plurality of fastener elements extend.

19. A method for producing an adhesive fastener component comprising the steps of:

forming a flat carrier with opposite first and second surfaces, and a plurality of fastener elements protruding from the first surface of the flat carrier and being one of hooks, mushroom heads and loops; and subsequently applying a heater directly onto one of the flat carrier and another carrier laminated to the flat carrier at least in certain sections of the flat carrier, for converting supplied energy into heat, by printing in one of thick and thin film technology.

20. A method according to claim 19 wherein prior to applying the heater to the flat carrier with the fastener elements, a surface treatment is performed on the flat carrier to improve adhesion of the heater.

* * * * *